United States Patent
Tejeda et al.

(10) Patent No.: US 12,018,776 B1
(45) Date of Patent: Jun. 25, 2024

(54) THREADED CONNECTION

(71) Applicant: Tejas Tubular Products, Inc., Houston, TX (US)

(72) Inventors: Maximo Tejeda, Houston, TX (US); Maximo Tejeda, Jr., Houston, TX (US); Dimitris Katsareas, Houston, TX (US); Edgar Alejandro Zuniga, Houston, TX (US); Larry Palmer, Houston, TX (US)

( * ) Notice: Subject to any disclaimer, the term of this patent is extended or adjusted under 35 U.S.C. 154(b) by 0 days.

(21) Appl. No.: 17/580,259

(22) Filed: Jan. 20, 2022

(51) Int. Cl.
*F16L 15/06* (2006.01)
*F16L 15/00* (2006.01)

(52) U.S. Cl.
CPC ............ *F16L 15/007* (2013.01); *F16L 15/06* (2013.01)

(58) Field of Classification Search
CPC ....... F16L 15/002; F16L 15/007; F16L 15/06; E21B 17/042
See application file for complete search history.

(56) References Cited

U.S. PATENT DOCUMENTS

| | | | |
|---|---|---|---|
| 4,568,113 A * | 2/1986 | Axford | F16L 15/008 285/55 |
| 5,908,212 A | 6/1999 | Smith et al. | |
| 7,331,614 B2 | 2/2008 | Noel et al. | |
| 7,823,931 B2 | 11/2010 | Hamamoto et al. | |
| 8,136,846 B2 | 3/2012 | Church | |
| 9,683,684 B1 | 6/2017 | Williamson et al. | |
| 9,777,538 B2 * | 10/2017 | McGarian | E21B 17/16 |
| 9,951,569 B2 | 4/2018 | Tejeda et al. | |
| 9,970,576 B2 | 5/2018 | Williamson et al. | |
| 10,024,119 B2 | 7/2018 | Tejeda et al. | |
| 10,167,680 B2 * | 1/2019 | Adkins | E21B 17/042 |
| 2016/0160575 A1 * | 6/2016 | Hou | F16L 15/002 285/334 |
| 2016/0305585 A1 * | 10/2016 | Inose | E21B 17/042 |
| 2018/0259100 A1 | 9/2018 | Williamson et al. | |
| 2019/0017634 A1 | 1/2019 | Williamson et al. | |
| 2019/0032821 A1 * | 1/2019 | Sinclair | E21B 17/042 |
| 2019/0128075 A1 * | 5/2019 | Urech | E21B 17/042 |
| 2021/0033136 A1 * | 2/2021 | Garcha | F16L 5/06 |

* cited by examiner

*Primary Examiner* — David Bochna
(74) *Attorney, Agent, or Firm* — Werner IP Law, P.C.

(57) ABSTRACT

A threaded connection comprising a pin connecting having dual tapered threads and a box connection having mating dual tapered threads. There is an internal torque shoulder in the box connection, the torque shoulder having a negative angled surface which mates with an angled surface on the nose of the pin connection. The pin connection has an external torque shoulder having a negative angled surface which is engaged and mates with a negative angled surface formed on the face of the box connection.

13 Claims, 3 Drawing Sheets

THREADED CONNECTION

FIELD OF THE INVENTION

The present invention relates to threaded connections and, more particularly, to coupled tubing strings for use in workover applications, e.g., removal of bridge plugs such as frac plugs.

BACKGROUND OF THE INVENTION

At the present time, the combination of horizontal drilling and fracturing ("fracking" as it is known in the industry), is the only commercially viable way of producing natural gas from the vast majority of North American gas reserves.

As is well known to those skilled in the art, fracturing a formation is accomplished by pumping fluid, most commonly water, at high pressures and flow rates. Fluid is injected into the formation, fracturing it and creating flow paths to the well. Proppants, such as grains of sand, ceramic, or other particulates usually are added to the frac fluid and are carried into the fractures. The proppants serve to prevent fractures from closing when pumping has stopped.

In many wells, fracturing is accomplished by "plug and perfing". In a "plug and perf" operation the production liner is perforated using so called "perf" guns. A plug and perf operation can allow a well to be fractured in many different locations. Typically, the liner is perforated in a zone near the bottom of the well. Fluids are then pumped into the well to fracture the formations in the vicinity of the bottom perforations.

After the initial zone is fractured, a plug is installed in the liner at a point above the fractured zone. The liner is perforated again, this time in a second zone located above the plug. After the second zone is fractured, the plug process is then repeated until all zones in the well are fractured.

After the well has been fractured, the plugs or bridges may interfere with the installation of production equipment in the liner or may restrict the flow of production fluids upward through the liner. Retrievable plugs are designed to be set and unset whereby they can be removed from the well. Non-retrievable plugs are designed to be more or less permanently installed in the liner. Once installed and after the perf and plug operations are complete, the non-retrievable plugs must be drilled out to open up the liner.

Traditionally, coiled tubing has been the preferred method for drilling out frac plugs after hydraulic stimulation. Coiled tubing has been widely used because it has proven to be an effective option for completing shale wells with shorter lateral sections. However, beyond a lateral length of approximately 10,000 feet, deployment complications arise that diminish the efficiency of coiled tubing—and its ability to reach the toe of the well. For example, running coiled tubing in laterals longer than 10,000 feet raises the risk of helical buckling.

In U.S. Pat. No. 10,024,119 ('119 Patent), incorporated herein by reference for all purposes, there is described and claimed tubular strings such as tubing strings. The tubing strings made in accordance with the invention of the '119 Patent are designed to provide the capabilities required for extended reach, e.g., 20,000 feet or longer, torque intensive, wear inducing, frac-plug drill-outs.

SUMMARY OF THE INVENTION

In one aspect, the present invention relates to a coupled tubing string for workover operations wherein the couplings shield the upset area of the pin connections from wear.

In still a further aspect, the present invention relates to a coupled tubing string wherein the couplings act as sacrificial wear portions of the string.

In yet another aspect, the present invention relates to a coupled tubing string for workover operations which can obviate the need for hard banding of the couplings in the string.

In still another aspect, the present invention provides a coupled tubing string wherein the couplings have substantially the same wear characteristics as a hard banded coupling.

These and further features and advantages of the present invention will become apparent from the following detailed description, wherein reference is made to the figures in the accompanying drawings.

DETAILED DESCRIPTION OF PREFERRED EMBODIMENTS

In the description which follows while the threaded connection of the present invention will be described with reference to a coupled tubing string particularly useful in workover operations, in oil and gas wells, it is not so limited. In particular, the coupled threaded connection of the present invention is particularly useful on 2⅜ inch and 2⅞ inch tubing. The threaded connection of the present invention may also find use in coupled casing strings and other oilfield tubular strings. All references to "angle(s)" are angles with respect to the long axis of the threaded connection.

The threaded portions of the pin connections and box connections of the present invention comprise a continuous helical thread having a first, straight section and a second, tapered section, the change from straight to tapered occurring without any loss of pitch. The straight section of the thread allows the connection to be deep stabbing and to make-up faster. Further, it helps reduce hoop stress in the box and the pin as opposed to a tapered thread which induces hoop stress due to the taper. At the same time, the tapered section of the thread provides resistance to back off as for a normal tapered thread, although over a much smaller area.

Figure 1:
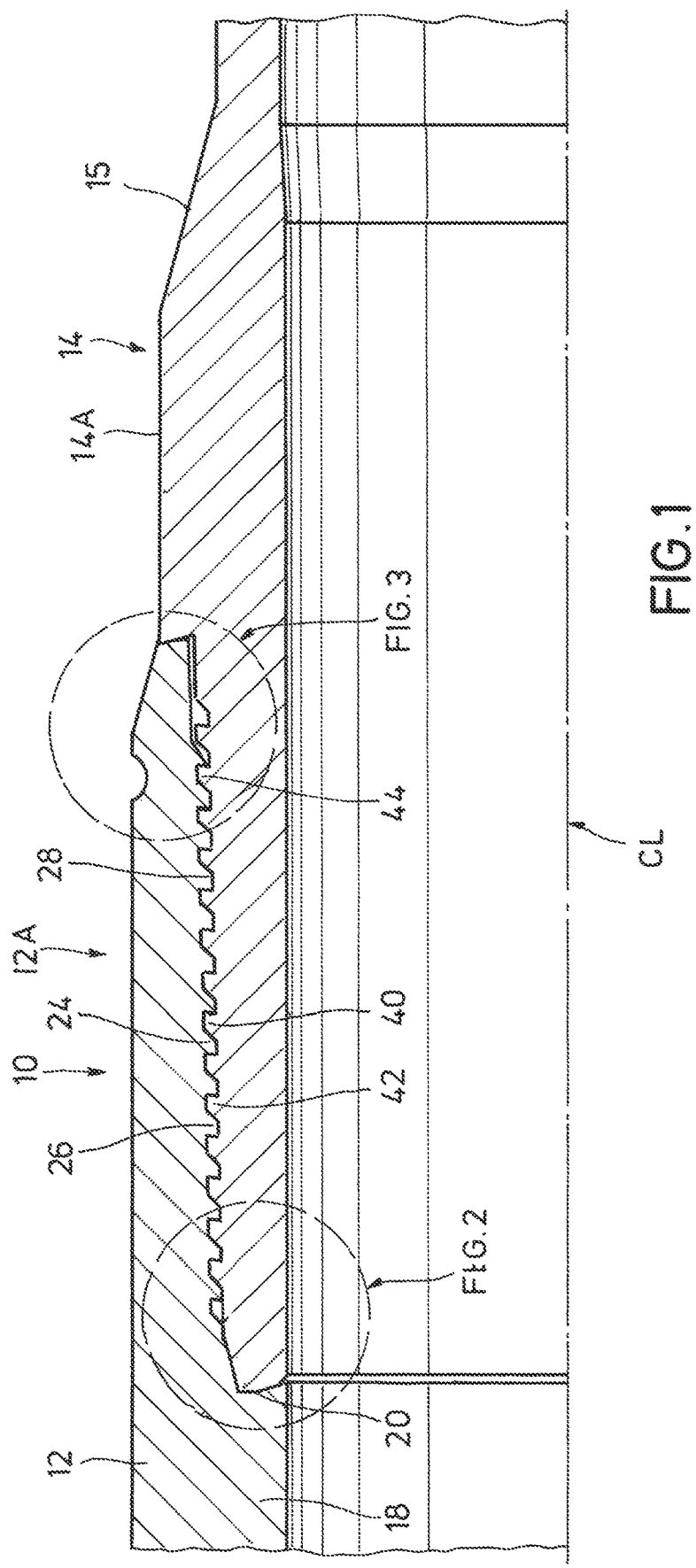
FIG. 1 is a one-quarter, longitudinal, section view of a made-up threaded connection according to one embodiment of the present invention.

Referring first to FIG. 1, there is shown an embodiment of the present invention which includes a coupling, shown generally as 10, the coupling having a coupling body 12, a first box connection shown generally as 12A on one end of coupling body 12 and a second box connection (not shown) on the opposite end of coupling body 12. The threaded connection of FIG. 1 further includes a first pin connection shown generally as 14 receivable in box connection 12A, there being a second pin connection receivable in the other box connection (not shown). As well known to those skilled in the art, the pin connections, e.g., pin connection 14, are connected to a section of pipe, e.g., tubular member 15 and have an upset portion 14A.

Coupling body 12 has an integrally formed, annular, radially inwardly extending rib 18 having a first annular axially facing torque shoulder 20 in first box connection 12A and a second annular axially facing torque shoulder (not shown) in the second box connection (not shown). As noted, there are two box connections formed on coupling 10, however only one of the box connections, box connection 12A, will be described in detail, it being understood that the other box connection is the same.

Box connection 12A has a threaded portion 24 comprised of a dual, helical thread. The threaded portion 24 has a first, straight threaded section 26, and a second, angled or tapered threaded section 28. The reference to straight or angled/tapered, as used herein, is with respect to the respect to the angle of the taper of the threads relative to an axis (shown in FIG. 1) coaxial with the outside diameter (OD) of the coupling body 12 or in the case of the pin connections an axis concentric with the inside diameter (ID) of the pin connection 14. Pin connection has a threaded portion 40 which is complementary to threaded portion 24 of box connection 12A. Thus, threaded portion 40 has a straight threaded section 42 and a tapered threaded section 44. Threaded connection 10 has an internal shouldering portion circled as DETAIL 1A in FIG. 1 and described with reference to FIG. 2, and an external shouldering portion circled as DETAIL 1B on FIG. 1 and described with reference to FIG. 3

Figure 2:
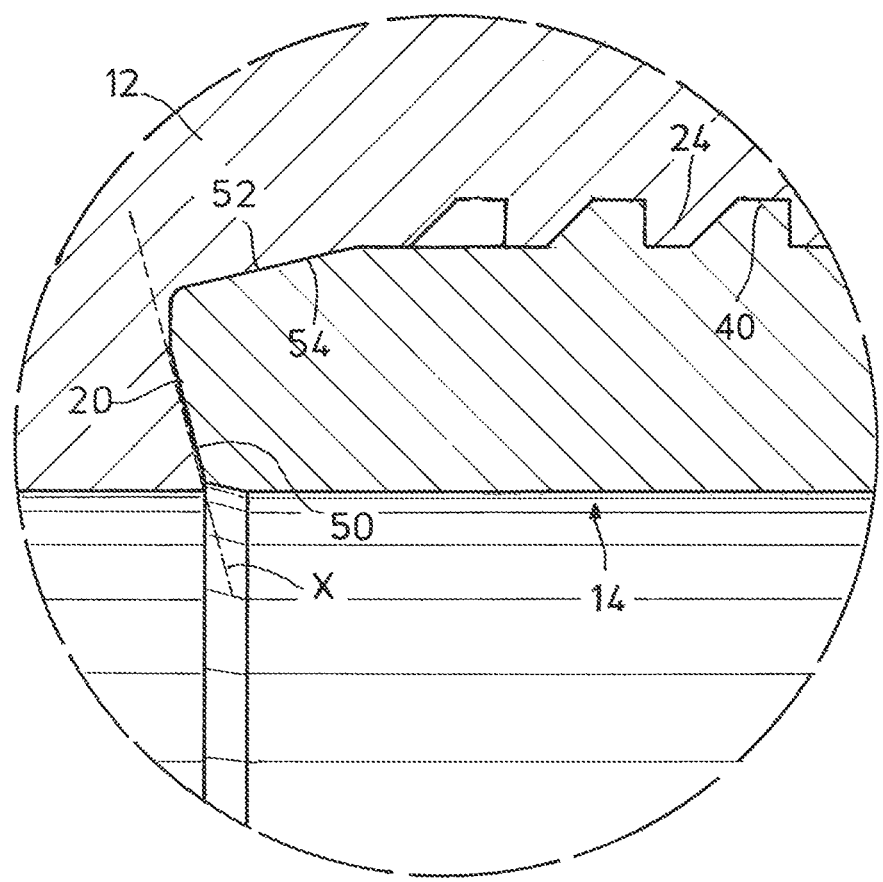
FIG. 2 is an enlarged view of DETAIL 1A of FIG. 1.

Turning now to FIG. 2, the internal shouldering portion in threaded connection 10 comprises a frustoconical torque shoulder 20, and a frustoconical surface 52, frustoconical torque shoulder 20 being at a negative angle X of from about 10° to about 20°, preferably from about 14° to about 16°. Pin connection 14 has a frustoconical surface 54 complementary to frustoconical surface 52 and also has a frustoconical surface 50 which also is at a negative angle X so as to mate with the torque shoulder 20 on box connection 12A when the threaded connection of the present invention is made-up as shown in FIG. 1, when engaged surfaces 52 and 54 form a metal-to-metal gas-tight seal.

Figure 3:
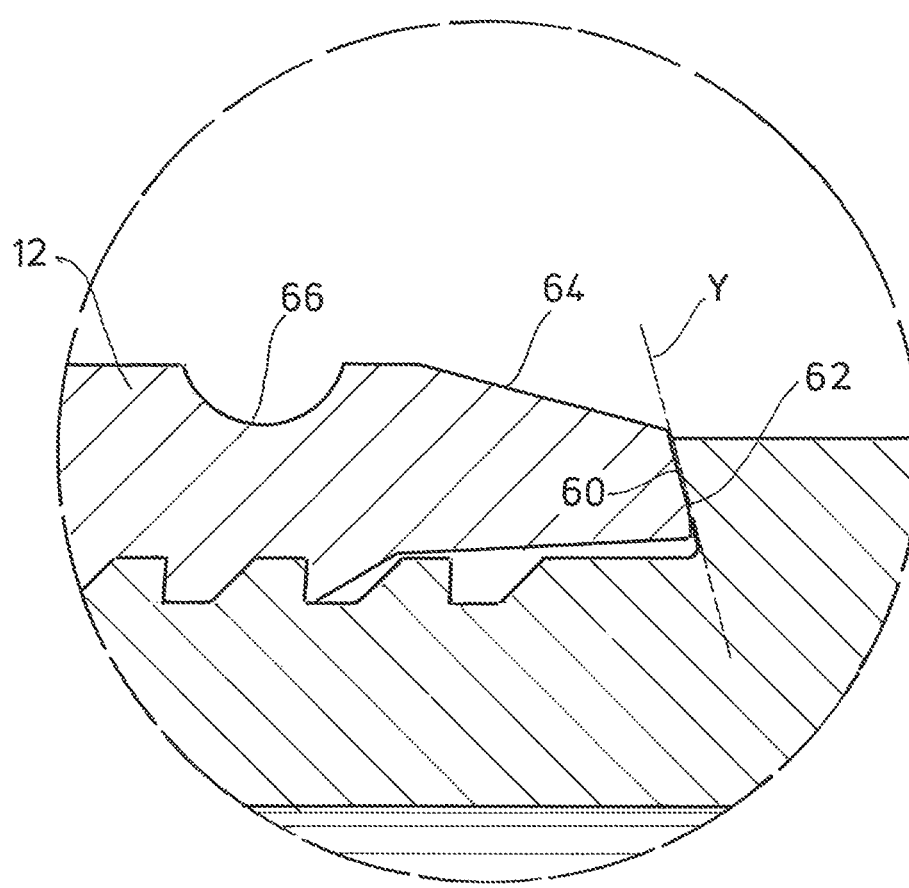
FIG. 3 is an enlarged view of DETAIL 1B of FIG. 1.

Turning next to FIG. 3, the external torque shouldering area circled as DETAIL 1B in FIG. 1 is shown. As can be seen, coupling body 12 has an axially outer coupling face defined in part by a frustoconical surface 60 which mates with a correspondingly angled pin connection torque shoulder having a surface 62, the area of internal torque shoulder 20 being greater than the area of the torque shoulder formed externally on pin connection 14. Frustoconical surfaces 60 and are at a negative angle Y of from about 10° to about 20°, preferably from about 14° to about 16.

Box connection 12A also has an annularly extending bevel 64 contiguous surface 60, bevel 64 being at an angle of from about 10° to about 20°, preferably about 15°. It will be readily apparent that bevel 64 eliminates any abrupt shoulder between pin 14 and coupling 10. The shallow angled bevel 64 effectively ensures that the coupling face of coupling body 12 is buried in the sense that there is minimal OD transition between the nose of pin connection 14 and bevel 64. The shallow angled bevel 64 ensures smooth drill outs of bridge plugs and keeps the connection free of hang ups while running in or pulling out.

One of the features of the present invention is that the couplings used in the threaded connection of the present invention serve a sacrificial function, minimizing the wear in the upset area 14A of pin connection 14. In this regard, it is common in an attempt to prolong the operational life of the upset area of a pin connection to weld a hardband on the coupling, the hardband generally being about 0.750" wide and 0.093" thick. These hardbanded couplings are considerably more expensive than the standard API couplings used in threaded connections of the type under consideration. Moreover, in addition to being more expensive, hardbanded connections suffer from a disadvantage that if the threaded connection is lost or stuck in the hole and has to be fished out, it is more difficult to grab for retrieval from the well.

The chart below demonstrates the advantages of the threaded connection of the present invention versus a hardbanded integral connection commonly used in workstrings.

| Connection A-Inventive Coupling | Connection B-Prior Art Hardbanded Integral Connection |
| --- | --- |
| Tube body OD 2-7/8 in., 7.90 ppf | Tube body OD 2-7/8 in., 7.90 ppf |
| Connection OD 3.525 in. (coupling OD) | Connection OD 3.438 in. (upset OD) OD 3.624 in. with hardbanding |
| Coupling replacement OD 3.400 in. | Joint replacement OD 3.312 in. |
| Wear value 0.125 in. | Wear value 0.126 in. More expensive than Connection A |

As can be seen from the above chart, the threaded connection of the present invention (Connection A) displays marked advantages in using the coupling, i.e., as a sacrificial wear piece. Although Connection A has half the hardness of hardbanding, it has eight times the wear area compared to the hardbanded Connection B. The net result is that the threaded connection of the present invention has almost four times the life of the competitive, prior art hardbanded integral connection.

Referring again to FIG. 3, it can be seen that coupling body 12 has an external, annular, radiused groove 66 which is located proximate bevel 64. It will be understood that there is a similar groove (not shown) on the other end of coupling body 12. Annular groove 66 serves as a wear indicator which can visually alert workers that the coupling is worn to the point that it has to be discarded. Groove 66 can have many cross-sectional configurations provided that the surface of the groove 66 does not include demarcations or other non-smooth formations which could act as stress inducers. Thus, groove 66 can have a depth of about 0.125", groove 66 having a radius of about 0.0625". It will be understood that the depth and radius of groove 66 can vary.

Figure 4:
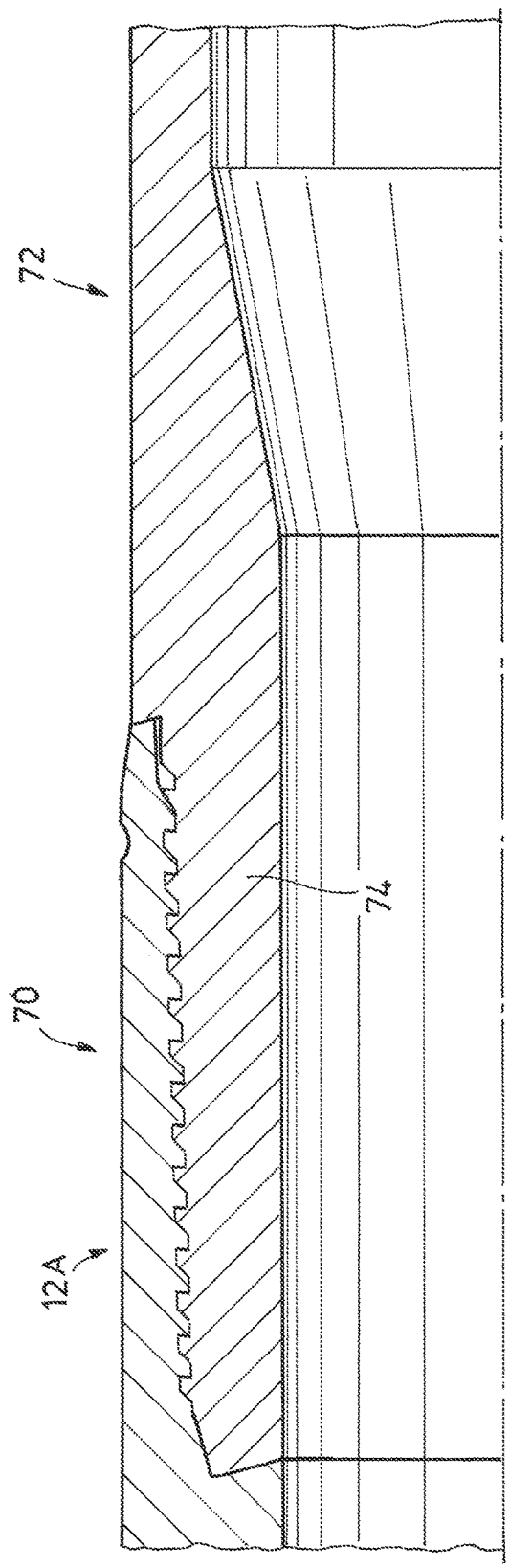
FIG. 4 is a view similar to FIG. 1 showing a slim, threaded connection according to one embodiment of the present invention.

Referring now to FIG. 4, there is shown an embodiment of the threaded connection of the present invention for use in smaller diameter casing, e.g., 4.5". Unlike the threaded connection discussed above, the "slim" threaded connection of FIG. 4 shown generally as 70, as to the box connection, is essentially the same as box connection 12A shown and described in FIG. 1. The primary difference between the threaded connection of FIG. 1 and the threaded connection of FIG. 4 is that in the "slim" threaded connection of FIG. 4, the upset 74 on pin connection is internal.

Figure 5:
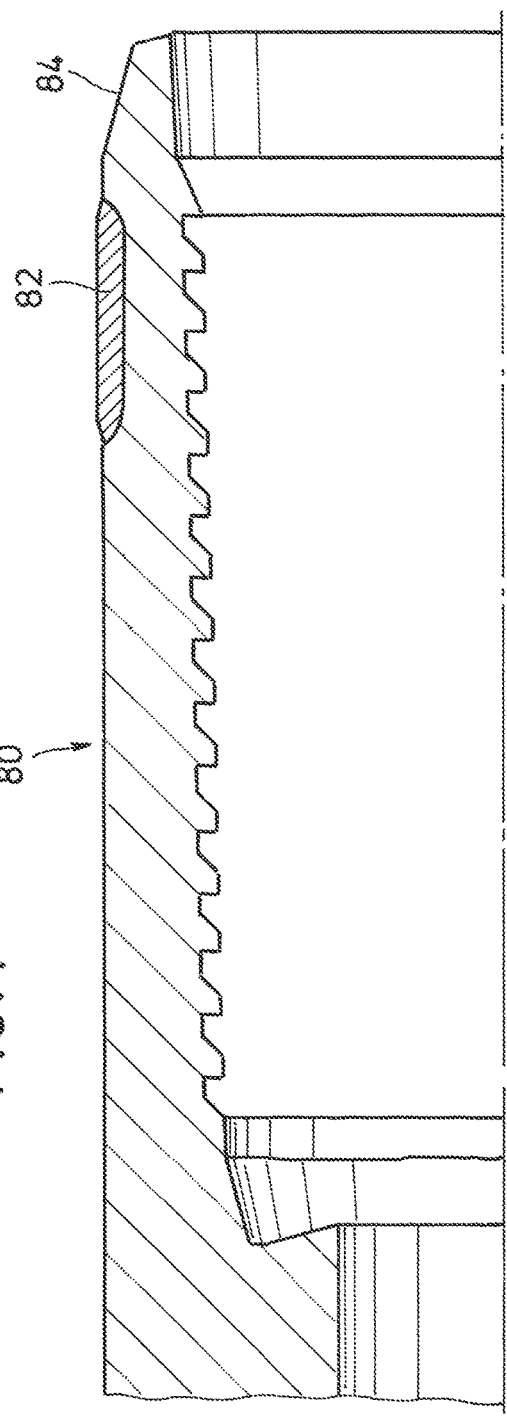
FIG. 5 is a one-quarter, longitudinal, section view of a portion of a coupling which can be used in some embodiments of the present invention.

Turning now to FIG. 5 there is shown a coupling which can be used in some embodiments of the threaded connection of the present invention. Unlike the couplings described above, e.g., coupling 12A, coupling 80 shown in FIG. 5 has all of the features described above with respect to coupling 12A, the difference being that coupling 80 shown in FIG. 5 has hardbanding. Thus, there is shown a hardband 82 proximal bevel 84 of coupling 80, it being understood that there is similar hardbanding (not shown) on the opposite end (not shown) of coupling 80.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A coupled threaded connection comprising:
   first and second pin connections, each of said pin connections having a pin nose, an externally threaded portion having a first threaded section with a substantially zero angle of thread taper with respect to said long axis of said pin connection and a second threaded section having an angle of thread taper of greater than zero with respect to said long axis of said pin connection, said pin nose forming an annular, axially facing, surface, a pin thread-free section on adjacent said pin nose, said pin thread-free section having a pin frustoconical surface adjacent said pin nose, said pin connection having an external annular, axially facing, negative angle torque shoulder;
   a coupling body comprising first and second box connections for threadedly receiving said first and second pin connections, respectively, each of said box connections comprising an internal threaded portion having first and second internal threaded sections complementary to said first and second externally threaded sections of said pin connection, respectively, said box connection having an internal annular, negative angle torque shoulder forming an annular surface at an angle supplementary to the angle of said first annular surface, there being a box thread-free section extending from said internal torque shoulder to the threaded portion of said box connection, said box thread-free section including an internal, axially extending box frustoconical surface, said box connection having a box end surface at an angle supplementary to said negative angle surface of said external annular torque shoulder on said pin connection;
   said pin nose engaging said internal, annular shoulder in said box, and said pin connection external annular shoulder engaging said box end surface when said threaded connection is made-up;
   there being first and second bevel surfaces on said coupling body adjacent said end surfaces of said respective box connections, and there being first and second axially spaced annular grooves formed externally on said coupling body, said first and second grooves being proximal said first and second bevel surfaces, respectively, on said coupling body.

2. The threaded connection of claim 1, wherein said coupling body has a first end face, a second end face and an axial, generally cylindrical bore extending from said first end face to said second end face, said coupling body having a generally centrally disposed, radially inwardly projecting annular rib forming first and second annular, internal shoulders in said first and second box connections, respectively.

3. The threaded connection of claim 1, wherein the threads of said threaded sections of said pin connections and said box connections are hook threads.

4. The threaded connection of claim 1, wherein the threads of said threaded sections of said pin connections and said box connections comprise a double-start thread.

5. The threaded connection of claim 1, wherein said beveled surfaces are at an angle of about 15°.

6. The threaded connection of claim 1, wherein each of said first and second grooves is radiused.

7. The threaded connection of claim 6, wherein each of said first and second grooves has a radius of about 0.0625 inches.

8. The threaded connection of claim 1, wherein each of said grooves has a depth of about 0.125 inches.

9. The threaded connection of claim 1, wherein the engageable surface area on said internal annular shoulder is greater than the engageable surface area of said external annular shoulder.

10. The threaded connection of claim 1, wherein said pin connections are connected to a tubular member having a nominal OD of 2⅞ inches.

11. The threaded connection of claim 1, wherein said pin connections are connected to a tubular member having a nominal OD of 2⅜ inches.

12. The threaded connection of claim 1, wherein said pin connections have an internal upset portion adjacent the pin nose.

13. A coupled threaded connection comprising:
   first and second pin connections, each of said pin connections having a pin nose and an internal upset portion adjacent said pin nose, an externally threaded portion having a first threaded section with a substantially zero angle of thread taper with respect to said long axis of said pin connection and a second threaded section having an angle of thread taper of greater than zero with respect to said long axis of said pin connection, said pin nose forming an annular, axially facing, surface, a pin thread-free section on adjacent said pin nose, said pin thread-free section having a pin frustoconical surface adjacent said pin nose, said pin connection having an external annular, axially facing, negative angle torque shoulder;
   a coupling body comprising first and second box connections for threadedly receiving said first and second pin connections, respectively, each of said box connections comprising an internal threaded portion having first and second internal threaded sections complementary to said first and second externally threaded sections of said pin connection, respectively, said box connection having an internal annular, negative angle torque shoulder forming an annular surface at an angle supplementary to the angle of said first annular surface, there being a box thread-free section extending from said internal torque shoulder to the threaded portion of said box connection, said box thread-free section including an internal, axially extending box frustoconical surface, said box connection having a box end surface at an angle supplementary to said negative angle surface of said external annular torque shoulder on said pin connection;
   said pin nose engaging said internal, annular shoulder in said box, and said pin connection external annular shoulder engaging said box end surface when said threaded connection is made-up.

* * * * *